(12) United States Patent
Nicholson (10) Patent No.: US 7,597,048 B2
(45) Date of Patent: Oct. 6, 2009

(54) SELF-PROPELLED VEHICLE FOR USE IN A CONDUIT

(75) Inventor: Colin Bruce Nicholson, Tauranga (NZ)

(73) Assignee: Pipeworks International Limited, Tauranga (NZ)

( * ) Notice: Subject to any disclaimer, the term of this patent is extended or adjusted under 35 U.S.C. 154(b) by 144 days.

(21) Appl. No.: 10/583,548

(22) PCT Filed: Dec. 20, 2004

(86) PCT No.: PCT/NZ2004/000330

§ 371 (c)(1),
(2), (4) Date: Jan. 19, 2007

(87) PCT Pub. No.: WO2005/061944

PCT Pub. Date: Jul. 7, 2005

(65) Prior Publication Data

US 2007/0151475 A1 Jul. 5, 2007

(30) Foreign Application Priority Data

Dec. 20, 2003 (NZ) ...................................... 529182

(51) Int. Cl.
*B61B 13/10* (2006.01)
*G01N 27/82* (2006.01)
(52) U.S. Cl. .................................... 104/138.2; 324/220
(58) Field of Classification Search ............... 104/138.2
See application file for complete search history.

(56) References Cited

U.S. PATENT DOCUMENTS

| | | | | |
|---|---|---|---|---|
| 4,522,129 A | * | 6/1985 | Jerberyd ................... | 104/138.1 |
| 4,622,709 A | * | 11/1986 | Matsuda ............................ | 15/4 |
| 4,919,223 A | * | 4/1990 | Egger et al. ................... | 180/8.1 |
| 5,018,451 A | * | 5/1991 | Hapstack ................. | 104/138.2 |
| 5,080,020 A | * | 1/1992 | Negishi ..................... | 104/138.2 |
| 5,878,783 A | * | 3/1999 | Smart ........................... | 138/93 |
| 6,044,769 A | * | 4/2000 | Oka et al. ................. | 104/138.2 |
| 6,076,407 A | * | 6/2000 | Levesque et al. .............. | 73/623 |
| 6,107,795 A | * | 8/2000 | Smart ......................... | 324/220 |
| 6,339,993 B1 | * | 1/2002 | Comello et al. .......... | 104/138.2 |
| 6,427,602 B1 | * | 8/2002 | Hovis et al. ............... | 104/138.1 |
| 6,450,104 B1 | * | 9/2002 | Grant et al. ............... | 104/138.2 |
| 6,769,321 B1 | * | 8/2004 | Appleton et al. ........... | 73/866.5 |

(Continued)

FOREIGN PATENT DOCUMENTS

DE 40 17 368 A1 12/1991

(Continued)

*Primary Examiner*—S. Joseph Morano
*Assistant Examiner*—Jason C Smith
(74) *Attorney, Agent, or Firm*—Young & Thompson (57) ABSTRACT

A vehicle for travel through a conduit includes a forward and a rearward member, each member being provided with a wall-engaging mechanism for selectively engaging a wall of the conduit to hold the respective member in a stationary position within the conduit. Extensible elements such as a hydraulic ram connect the members for relative movement of the forward member toward and away from the rearward member. Each wall-engaging mechanism includes a plurality of legs extendable outwardly from the respective member and a wall-engaging surface on or fixed to each leg, one actuator engages each of the legs for coordinated extension of the legs to bring each wall-engaging surface into contact with the wall of the conduit. Preferably a rotary cuter is mounted at the front of the vehicle for clearing obstructions in the conduit.

20 Claims, 7 Drawing Sheets

U.S. PATENT DOCUMENTS

| | | | |
|---|---|---|---|
| 7,398,736 B2 * | 7/2008 | Appleton | 104/138.2 |
| 2007/0000406 A1 * | 1/2007 | Stout | 104/138.2 |
| 2007/0151475 A1 * | 7/2007 | Nicholson | 104/138.2 |

FOREIGN PATENT DOCUMENTS

| | | |
|---|---|---|
| DE | 197 46 510 A1 | 4/1999 |
| EP | 0 085 504 A2 | 8/1983 |
| EP | 0 123 762 A1 | 11/1984 |
| EP | 0 461 964 B | 12/1991 |
| GB | 2159071 | 11/1985 |
| JP | 8-165710 | 6/1996 |
| JP | 2003-093987 A | 4/2003 |
| WO | WO 87/06323 | 10/1987 |
| WO | WO 97/14910 | 4/1999 |

* cited by examiner

SELF-PROPELLED VEHICLE FOR USE IN A CONDUIT

TECHNICAL FIELD

The invention relates generally to self-propelled vehicles for use in conduits, and in particular to remote-controlled vehicles with apparatus for cleaning conduits.

BACKGROUND ART

Remote-controlled vehicles can be used for carrying tools, or other items, and can travel into hazardous or confined areas where human workers cannot go. However, designing vehicles capable of travelling through, and operating in, enclosed spaces such as within pipes, channels, ducts or other conduits, has presented difficulties.

One class of such vehicles are those which are self-propelled by a linear actuator, or the like. These vehicles include two bodies connected by the actuator for moving the bodies towards and away from each other, by which movement the vehicle is able to propel itself through the pipe in a stepwise manner. The bodies may include bristles or bladders for engagement with the wall of the pipe. A disadvantage with such vehicles is that they are unsuited to provide strong frictional engagement with the pipe, such as may be required when performing different operations within the pipe, such as clearing an obstruction.

U.S. Pat. No. 6,415,722 addresses this drawback and describes a vehicle propelled by a linear hydraulic actuator having a central cylinder with a through-extending piston rod. Three sets of rigid legs are fixed to the actuator and may be extended by actuators which control engagement with the walls of the pipe. Two sets of legs are fixed to opposing ends of the rod and the third set is fixed to the cylinder. The vehicle is powered and controlled remotely and may be stepped along the conduit by alternately fixing the cylinder and rod by means of the attached legs while moving the piston rod. A mechanical breakdown of the vehicle within a pipe can result in considerable cost and inconvenience and thus mechanical complexity, with the attendant risk of a malfunction, is disadvantageous where it does not provide significantly improved performance. This prior art vehicle is designed for use in oil pipelines and is of relatively complex construction making it potentially expensive and difficult to operate and maintain. In particular, the complexity of this vehicle is increased by the provision of separate hydraulic actuators for extending each of the nine legs. Independent actuation of each leg in the vehicle is also disadvantageous where it is desired to accurately centre the vehicle within the pipe.

It will be understood that there is a need for a vehicle which may be manufactured at relatively low cost, making it a viable option for uses such as cleaning of drains. Another important consideration in the design of vehicles of this type is the ability to accommodate tools and associated apparatus for performing operations inside the pipe. The vehicle should be compact to provide room for such apparatus, making efficient use of the space available.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

It is an object of the present invention to address the foregoing problems or at least to provide the public with a useful choice.

Further aspects and advantages of the present invention will become apparent from the ensuing description which is given by way of example only.

DISCLOSURE OF THE INVENTION

According to one aspect of the present invention there is provided a vehicle for travel through a conduit comprising:

a forward and a rearward member, each member being provided with a wall-engaging mechanism for selectively engaging a wall of the conduit to hold the respective member in a stationary position within the conduit, each wall-engaging mechanism including a plurality of legs extendable outwardly from the respective member and a wall-engaging surface on or fixed to each leg;

extensible means connecting the members for relative movement of the forward member toward and away from the rearward member, and characterised in that a single actuator engages each of the legs of each wall-engaging mechanism for coordinated extension of the legs to bring each wall-engaging surface into contact with the wall of the conduit.

The extensible means preferably comprises a cylinder and rod, the cylinder being fixed to one of the forward and rearward members and the rod being fixed to the other of forward and rearward members, and wherein the actuator of the wall-engaging mechanism fixed to the cylinder includes an annular piston formed around the cylinder. The annular piston is fixed to the cylinder for sliding within a sleeve of the actuator, the sleeve being engaged with the legs for extension thereof.

Preferably the actuator of the wall-engaging mechanism fixed to the rod is received within the rod. Both actuators are preferably substantially concentric with, and mounted for movement in the direction of the longitudinal axis of the cylinder and rod connecting the forward and rearward members.

The legs are preferably of equal length, angularly spaced equidistantly around each member and mounted to allow each actuator to accurately centre each member and consequently centre the vehicle within a tubular conduit. Preferably the legs are pivotally mounted to the member.

At least one of the members preferably further includes wheels for engaging the walls of the pipe to support the member. The wheels may be retractable, and in the preferred embodiment, the wheels are connected to the wall-engaging mechanism such that the wheels are retracted when the wall-engaging surfaces are extended. At least one wheel is preferably resiliently connected to each leg to allow the wheel to ride over irregularities in the wall of the pipe.

A foot on which the wall-engaging surface is provided is preferably connected to or formed on each of the legs. The feet serve to spread the contact area, avoiding high point loads which may damage the pipe walls. In one embodiment each foot may be pivotally mounted to the leg. According to the conditions anticipated to be encountered in the conduit, the type of feet utilised may also be rigid or may be provided with a contact surface of resilient material for high friction.

Preferably each leg is pivotally attached to the foot by a first pivot and to the respective member by a second pivot; and the wall-engaging mechanism further includes a control link pivotally attached to the foot at one end by a third pivot and to the respective member at an opposite end by a fourth pivot for parallel movement of the foot.

The wall-engaging mechanism mounting the feet on the rearward member preferably includes a self-servo action automatically increasing the frictional engagement between the feet and the conduit when a rearwardly directed force is applied to the rearward member when the feet are engaged.

Each wall-engaging mechanism is preferably a modular assembly demountably fixed to the extensible means, thereby allowing the wall-engaging assemblies to be changed to accommodate different ranges of conduit sizes.

The actuator for the wall-engaging mechanism may be a fluid actuator (e.g. a hydraulic or pneumatic actuator) and is preferably a double-acting linear actuator.

Preferably the extensible means comprises a linear actuator and, for example, may be a fluid powered ram having a cylinder and rod and which is either single-acting with a spring return or double acting. The front member is preferably mounted to the cylinder and the rear member to the rod of the main actuator, with the wall-engaging actuator being received within the rod of the stepping actuator.

Preferably the wall-engaging mechanism is remotely controlled for extending and retracting the feet, allowing the apparatus to propel itself in a stepwise manner through the conduit in either direction.

The robust and adaptable nature of the wall-engaging mechanism permits high frictional forces to be applied via the feet. Thus, positive movement of the vehicle may be maintained to overcome obstruction, or to aid carrying/pulling heavy loads.

According to another aspect of the present invention there is provided apparatus for cleaning pipes including: the vehicle substantially as before described and further including means for loosening material to clear or clean the conduit. In a preferred embodiment this means for loosening material to clear or clean the conduit is a rotary cutter mounted at the front of the forward member. Preferably a water spray is provided at the cutter for lubrication, cleaning and aiding removal of the loosened material. Means may also be provided for removing the loosened material e.g. a vacuum line.

The wheels are preferably mounted on the front member to support the cutter centrally within the conduit while the front member is advanced.

According to another aspect of the present invention there is provided a device for transporting material in a first direction through a conduit, the device including:

an elongate shaft adapted to be fixed to means for reciprocating the shaft in the first direction and an opposing second direction;

a plurality of paddles for impinging the material, the paddles being fixed to the shaft at longitudinally spaced positions, each paddle being adapted to close so as to occlude at least a lower section of the conduit when moved in the first direction and to open so as not to occlude at least the lower section of the conduit when moved in the second direction such that material is transferred in the first direction between adjacent paddles.

In another aspect the invention provides a method of operating a vehicle substantially as described above including:

alternately operating each actuator to simultaneously extend the legs of the respective wall-engaging mechanism to contact the wall of the conduit, and operating the extensible means to move the forward and rearward members when the respective legs are in a retracted position in order to move the vehicle in a stepwise manner through the conduit.

In still another aspect the invention provides a method of operating apparatus for cleaning pipes substantially as described above, wherein the loosening means is fixed to the forward member and the apparatus further includes a sensor for sensing the load applied to the loosening means when it is brought into contact with the material to be cleaned or cleared from the conduit, including:

actuating the wall-engaging mechanism on the rearward member to engage the wall of the conduit to hold the rearward member in a stationary position;

operating the extensible means to advance the loosening means, and modulating the rate at which the loosening means is advanced in accordance with the load measured by the sensor.

The shaft may be rigid for use in a cylindrical conduit. Alternatively, means may be provided to accommodate a degree of curvature in the conduit e.g. a flexible shaft or flexible joints between sections of the shaft etc.

This transport device may be fixed to the vehicle substantially as described above, the shaft being fixed to the rearward member. The device may be actuated by reciprocation of the rearward member, or may be fixed to the rearward member by a reciprocating actuator. Alternatively the device may be fixed to other reciprocating means of a known type, manually or power-operated.

Each paddle is preferably fixed to the shaft by a pivot. Preferably the axes of each pivot are coplanar and adapted to extend horizontally in use. For use in a cylindrical conduit the paddles are at least partly circular e.g. semi-circular or circular. For other regular shaped conduits of constant section the paddles would be provided with a shape corresponding to that of the transverse section of the conduit.

This invention provides a vehicle for use in conduits which is effective and efficient in operational use, which reduces maintenance costs, and which is modular in construction allowing it to be used with different means for removing material from the conduit. It will be understood that a camera and light may be mounted to the vehicle for inspection purposes. The device may be economically constructed and has an overall simple design which minimizes manufacturing costs and maximizes performance.

BRIEF DESCRIPTION OF THE DRAWINGS

Further aspects of the present invention will become apparent from the following description which is given by way of example only and with reference to the accompanying drawings in which.

BEST MODES FOR CARRYING OUT THE INVENTION

Figure 1:
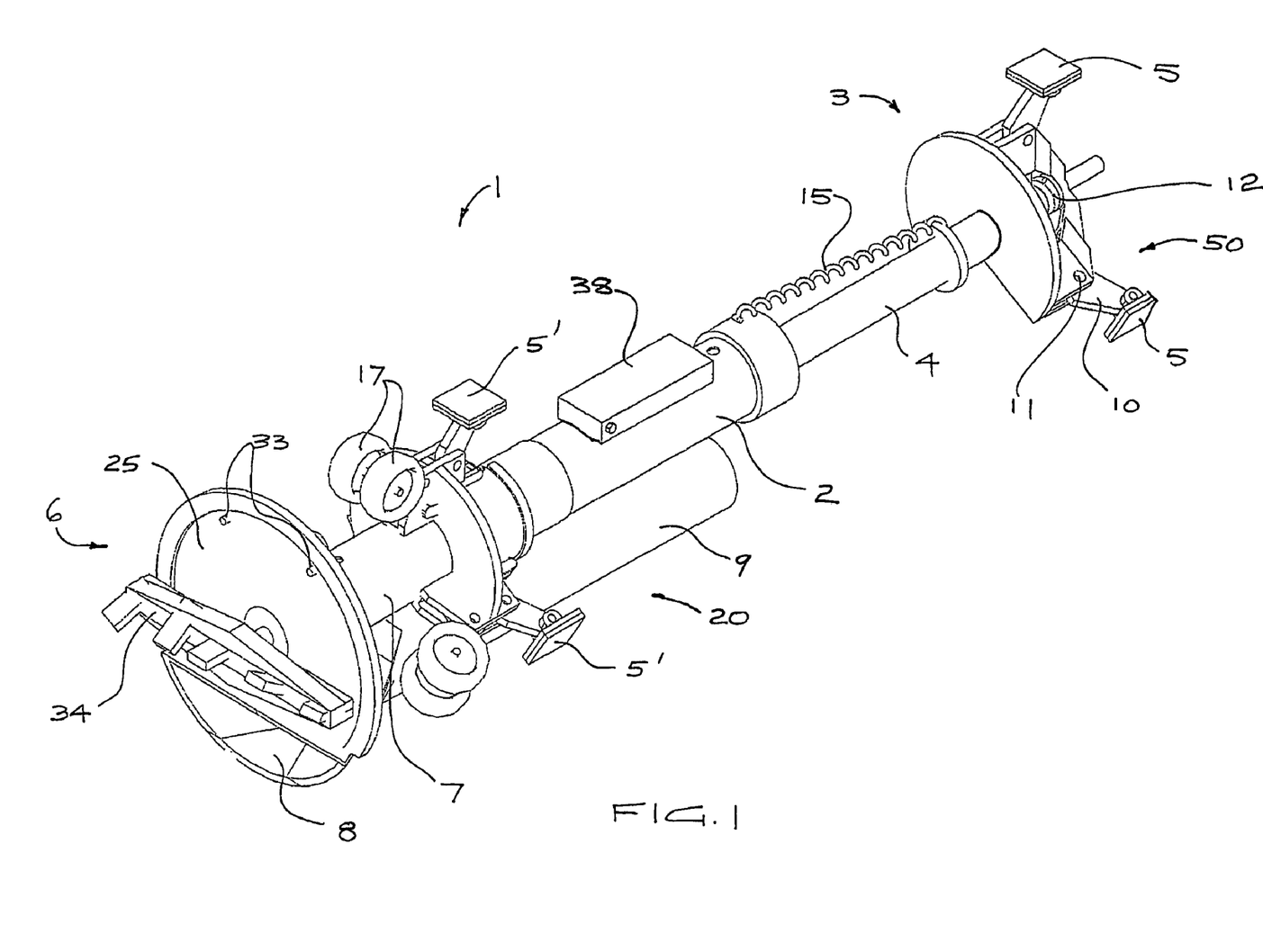
FIG. 1 is a pictorial view of a first embodiment of the vehicle of the present invention.

FIG. 1 illustrates a first embodiment of the vehicle of the present invention fitted with conduit cleaning apparatus. The vehicle generally comprises a forward member 1 mounted to a hydraulic cylinder 2, and a rearward member 3 mounted to a rod 4 received in the cylinder 2. A power actuated wall-engaging mechanism (described further with reference to FIGS. 2, 3a and 3b) is provided on both the forward and rearward members 1 and 3 for extending and retracting feet 5' and 5 respectively for selectively engaging the inner wall of a conduit 14 (see FIG. 2) to hold the members stationary. By coordinating the engagement and disengagement of the feet 5, 5' with the movement of the forward and rearward members 1, 3 by the hydraulic cylinder 2 and rod 4, the apparatus may propel itself through the conduit 14 in either direction in a stepwise manner.

A rotary cutter 6 mounted at the front of the forward member 1 on a hydraulic motor 7 is provided for loosening material to clear or clean the conduit 14. For removing the loosened material a vacuum is drawn through an evacuation tube (not shown) drawn behind the vehicle and connected to the outlet pipe 9 on the forward member 1 which draws in the material through the opening 8 formed at the base of the plate 25.

Figure 2:
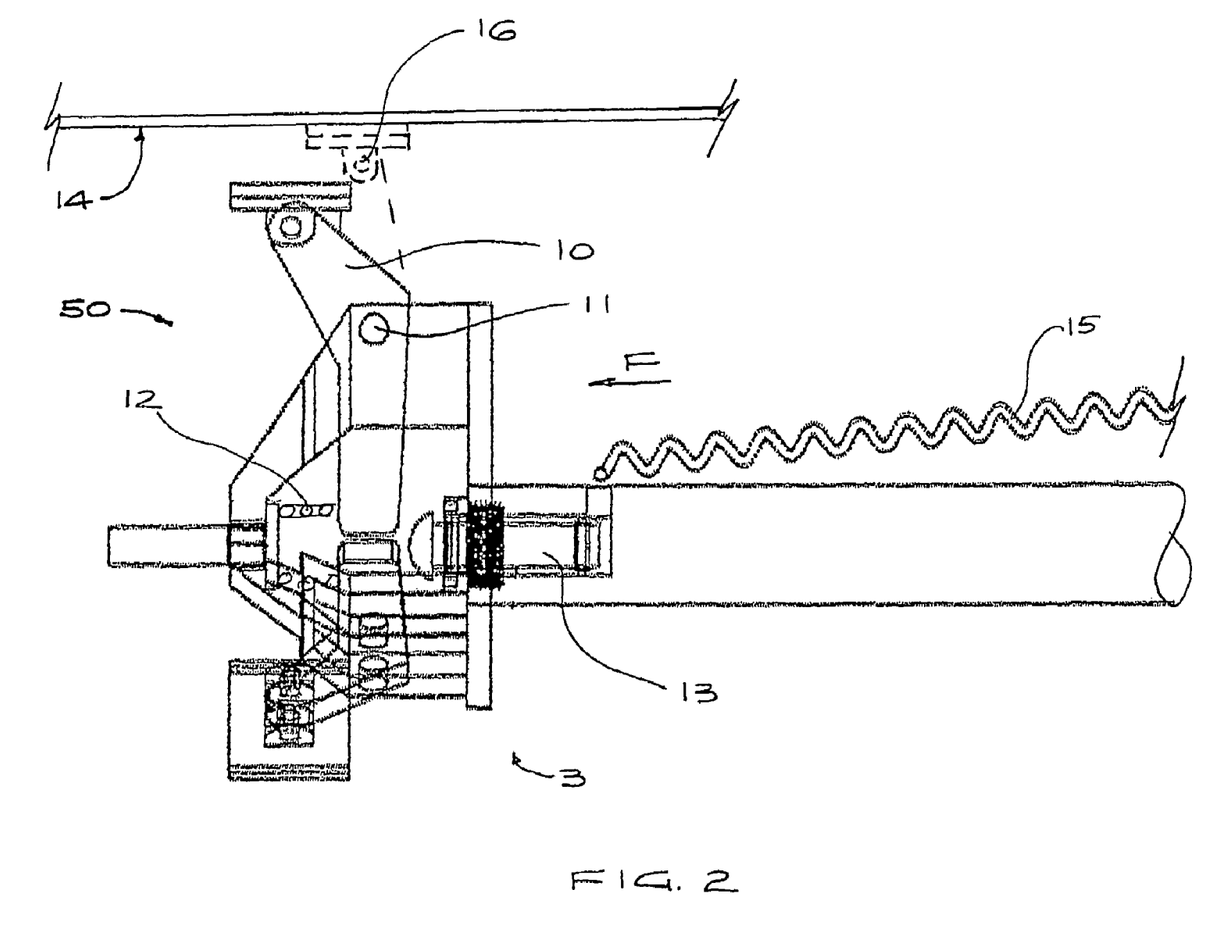
FIG. 2 is a detail of the forward member of the vehicle of FIG. 1.

Referring to FIGS. 1 and 2, the wall-engaging mechanism 50 on the rearward member 3 includes three legs 10 to which respective feet 5 are pivotably fixed. Each leg 10 extends generally radially and is fixed by pins 11 for pivoting movement between a retracted position (FIG. 2) and an outwardly extended position (shown in dashed outline in FIG. 2) for engagement with the wall of the conduit 14. A spring 12 for biasing the legs 10 to the retracted position and a linear actuator 13 for extending the legs contact opposing sides of a radially inner end of each leg 10. Hydraulic fluid is supplied to the actuator 13 through the flexible hose coil 15 extending from the forward member 1. In the extended position it will be understood that the force F applied to the rearward member 3 (e.g. when the forward member 1 is being driven forward) provides a self-servo action increasing the frictional engagement between each foot 5 and the conduit 14.

Figure 3A:
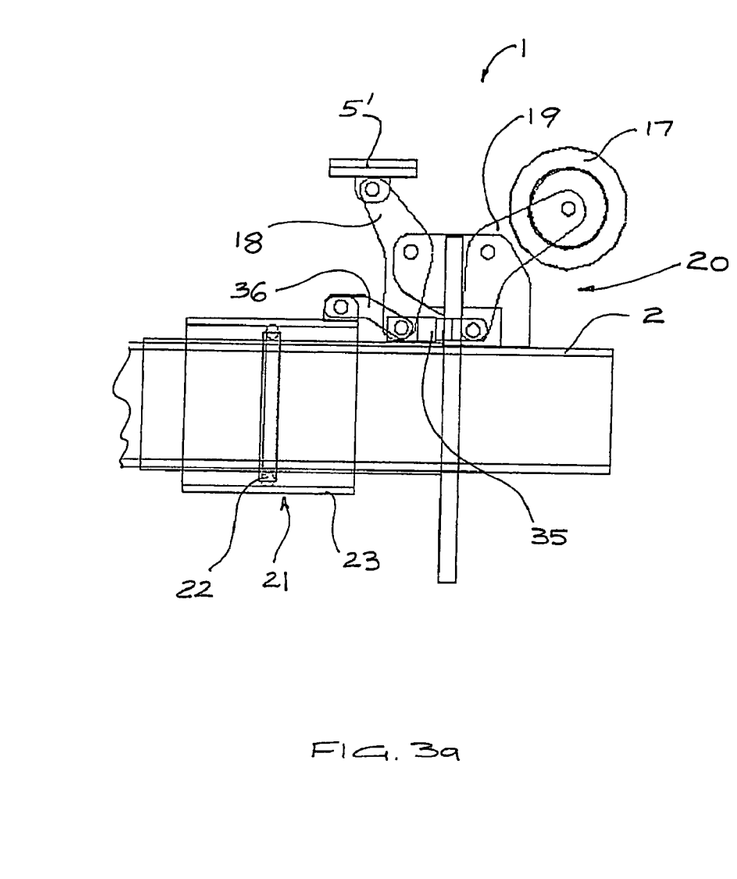
FIGS. 3a and 3b are details of the rearward member of the vehicle of FIG. 1.
Figure 3B:
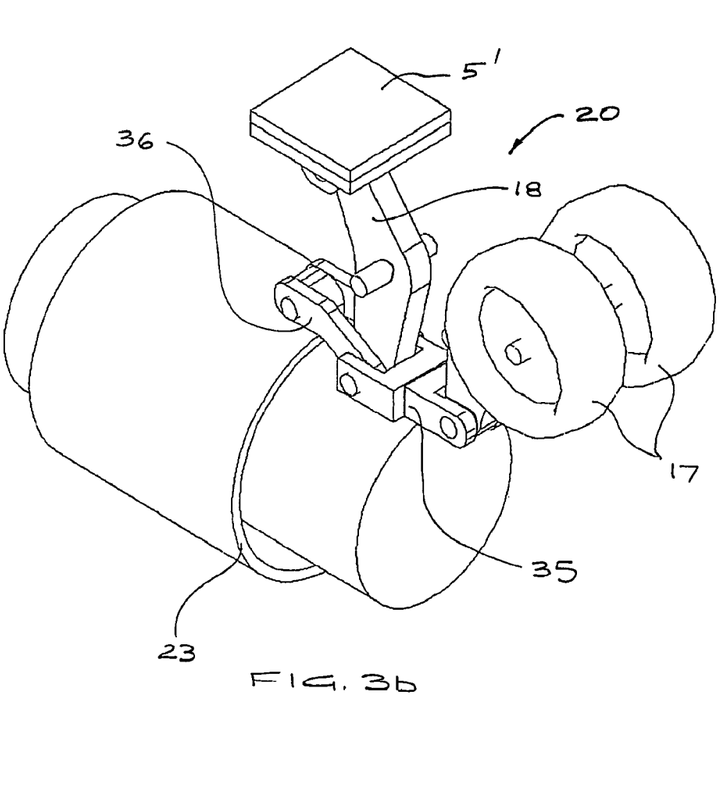

FIGS. 3a and 3b show the wall-engaging mechanism 20 provided for extending the feet 5' on the forward member 1 while simultaneously retracting the wheels 17, and vice versa. The three feet 5' are angularly evenly spaced about the cylinder 2 and are each pivotally mounted on radially extending pivoting legs 18. Associated with each of the legs 18 is a pivoting wheel bracket 19 (lying generally in the same radial plane as the respective arm 18) to which a pair of wheels 17 are fixed to support the forward member 1 when the forward set of feet 5' are retracted. The mechanism 20 is actuated by a hydraulic ram 21 having an annular piston 22 ringing the cylinder 2 and fixed thereto for sliding relative to a cylindrical sleeve 23. Pressurising the hydraulic fluid on either side of the piston 22 displaces the cylindrical sleeve 23 up or down the cylinder 2 for extending and retracting the feet 5' and wheels 17. The wall-engaging mechanism 20 includes a yoke 35 pivotally connecting each leg 18 and wheel bracket 19. A fork 36 pivotally connects the yoke 35 and the cylindrical sleeve 23.

Water jets 33 extending from the plate 25 direct a water spray (not shown) at the cutter blade 34 for lubrication, cleaning and aiding removal of the loosened material. Water is supplied to the forward member 1 in a hose (not shown). The apparatus is connected by control cables (not shown) to a remote controller (not shown) connected to the valve block 38 which incorporates the control valves governing each operation of the apparatus. Together with the control cables, water hose and evacuation tube, elongate hydraulic supply and return lines, (not shown) are bundled together to form an umbilical drawn behind the vehicle and connected to a remote power source and controller (not shown). Preferably programmable-logic-controllers are used in the controller to control each of the operations of the apparatus.

In operation, the apparatus may be stepped through the conduit 14 drawing the hydraulic lines and cables etc behind it until it reaches an obstruction.

With the front set of feet 5' retracted and the wheels 17 extended to engage the wall of the conduit 14, the actuator 13 is operated to lock the rearward member 3 in position. The end of the cylinder 2 opposing the rod 4 is then pressurised to extend the rod 4 and drive the forward member 1 in the forward direction.

The hydraulic ram 21 is operated to fix the forward member 1, retracting the wheels 17 and extending the front set of feet 5'. When the rearward member 3 is released a return spring (not shown) retracts the rod 4 (or, in a double-acting arrangement the rod end of the cylinder 2 is then pressurized to retract the rod 4) to draw the rearward member 3 in the forward direction.

The valve block 38 includes control valves (not shown) for automatically reversing the direction of travel of the rod 4 when it reaches the end of its stroke for controlling its reciprocating movement. Solenoid operated valves (not shown) control operation of the rams 13 and 21 for selectively engaging the feet 5, 5', the timing of which in cooperation with the reciprocation of the rod 4, controls the direction of travel.

When an obstruction is reached, the rearward member 3 is fixed and with the wheels 17 extended the cutter 6 is driven forward to loosen and remove the material encountered. A pressure sensing valve (not shown) reacts to an increase in pressure at the hydraulic motor 7, to reduce the rate at which the cutter 6 is advanced. The apparatus can be removed from the conduit by reversing the stepwise mode of travel described above.

A second embodiment of the vehicle is illustrated in FIGS. 4-8 and like numerals are used to refer to like components. The wall-engaging mechanism 50a on the rearward member 3 is also arranged generally symmetrically about the central elongate axis A of the vehicle, the feet being angularly spaced at 120°. The mechanism 50a extends and retracts the feet 5a generally radially and includes control links 66 for maintaining the wall-engaging face of each foot 5a generally parallel to the wall of the pipe. The wall-engaging mechanism 50a includes three rear legs 10a angularly spaced, each of the legs 10a being fixed between a pair of control links 66 connecting each foot 5a to the rearward member 3.

Figure 5:
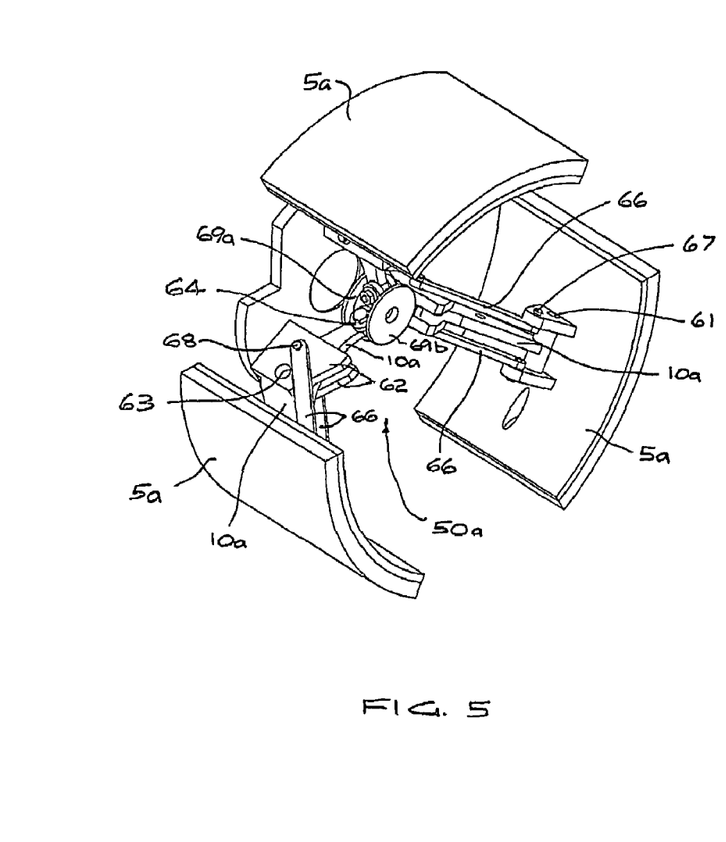
FIG. 5 is a pictorial view of a wall engaging mechanism of the vehicle of FIG. 4.
Figure 6:
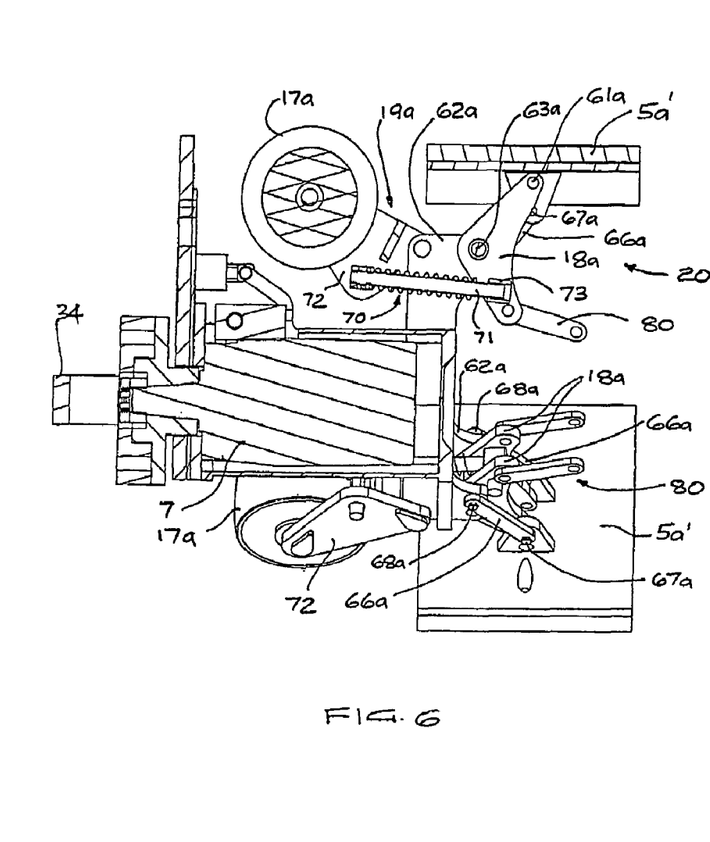
FIG. 6 is a longitudinal cross-sectional view of a wall engaging mechanism of the vehicle of FIG. 4.

Each leg 10a is pivotally attached to the foot 5a at an outer end by a first pivot 61 and to a mount 62 fixed to the rearward member 3 by a second pivot 63. A roller 64 fixed to an inner end of the leg 10a and the three rollers 64 are received between two radially-extending flanges 69a, 69b fixed to the rod 65 of actuator 13 for pivoting the legs 18a about their respective second pivots 63 to extend the feet 5a simultaneously.

Each pair of control links 66 is pivotally attached to the foot 5a at one end by coaxial third pivots 67 and to the mount 62 at an opposite end by coaxial fourth pivots 68, the pivots pivoting about parallel axes.

Figure 4:
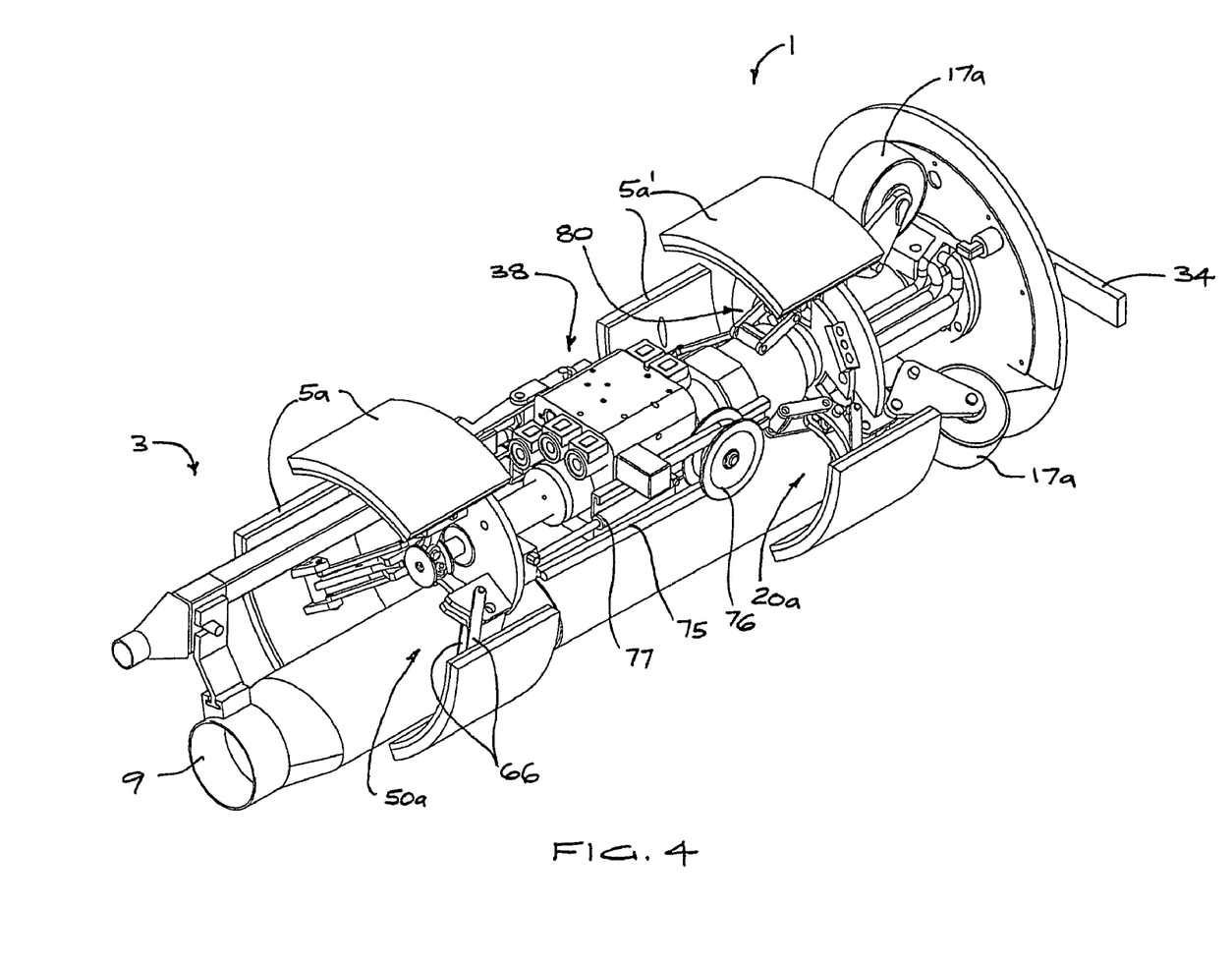
FIG. 4 is a pictorial view of a second embodiment of the vehicle of the present invention.

Hydraulic fluid supply and return hoses 75 are connected between the valve block 38 and the double-acting actuator 13. The hoses 75 pass around a wheel 76 and are tensioned by the gas spring 77. As in the first embodiment, in the extended position the force applied to the rearward member 3 (e.g. when the forward member 1 is being driven forward) provides a self-servo action increasing the frictional engagement between each foot 5 and the conduit 14.

Like the mechanism 50a, the wall-engaging mechanism 20a on the forward member 1 in the second embodiment of the vehicle extends and retracts the feet 5a' generally radially while employing control links 66a for maintaining the wall-engaging face of feet 5a' generally parallel to the wall of the pipe. The wheel bracket 19a is pivotably fixed to the mount 62a and resiliently connected to the pivoting legs 18a by means of compression spring 70 and bar 71. In this manner the wheels 17a are firmly pressed against the wall of the pipe when the front feet 5a' are retracted to centralise the cutter 34 in the pipe and provide a reaction against the torque applied to the cutter 34, while allowing the wheels 17a to ride over small irregularities in the wall of the pipe. The wheel bracket 19b includes opposed plates 72 between which the wheel 17a and one end of the bar 71 are pivotably fixed. The opposing end of the bar 71 is received for sliding in a bush 73 pivotally connected between a pair of legs 18a. The compression spring is received on the bar 71 and captured between the bush 73 and the pivot on the opposing end.

Each leg 18a is pivotally attached to the foot 5a' at an outer end by a first pivot 61a and to a mount 62a fixed to the forward member 1 by a second pivot 63a. Each pair of control links 66a is pivotally attached to the foot 5a' at one end by coaxial third pivots 67a and to the mount 62a at an opposite end by coaxial fourth pivots 68a, all the pivots 61a, 63a, 67a, 68a pivoting about parallel axes.

The mechanism 50a is actuated by a hydraulic ram 21 having an annular piston 22 ringing the cylinder 2 and fixed thereto for sliding relative to a cylindrical sleeve 23. Pressurising the hydraulic fluid on either side of the piston 22 displaces the cylindrical sleeve 23 up or down the cylinder 2 for extending and retracting the feet 5a' and wheels 17. The mechanism 50a includes a yoke 35 pivotally connecting each leg 18a and wheel bracket 19a. Three pairs of links 80 pivotally connect the cylindrical sleeve 23 and an inner end of each leg 18a.

Figure 7:
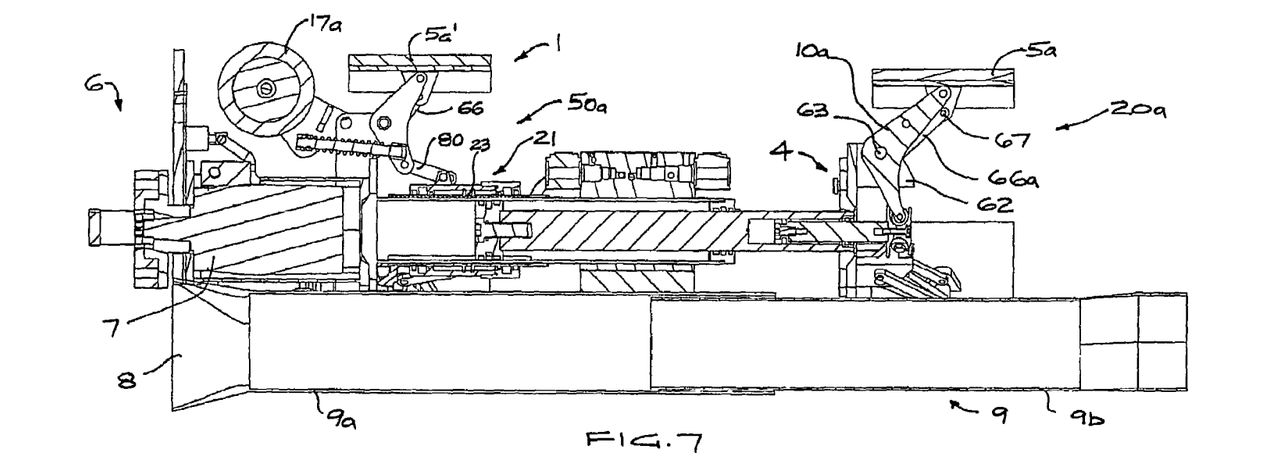
FIG. 7 is longitudinal cross-sectional view of the vehicle of FIG. 4.
Figure 8:
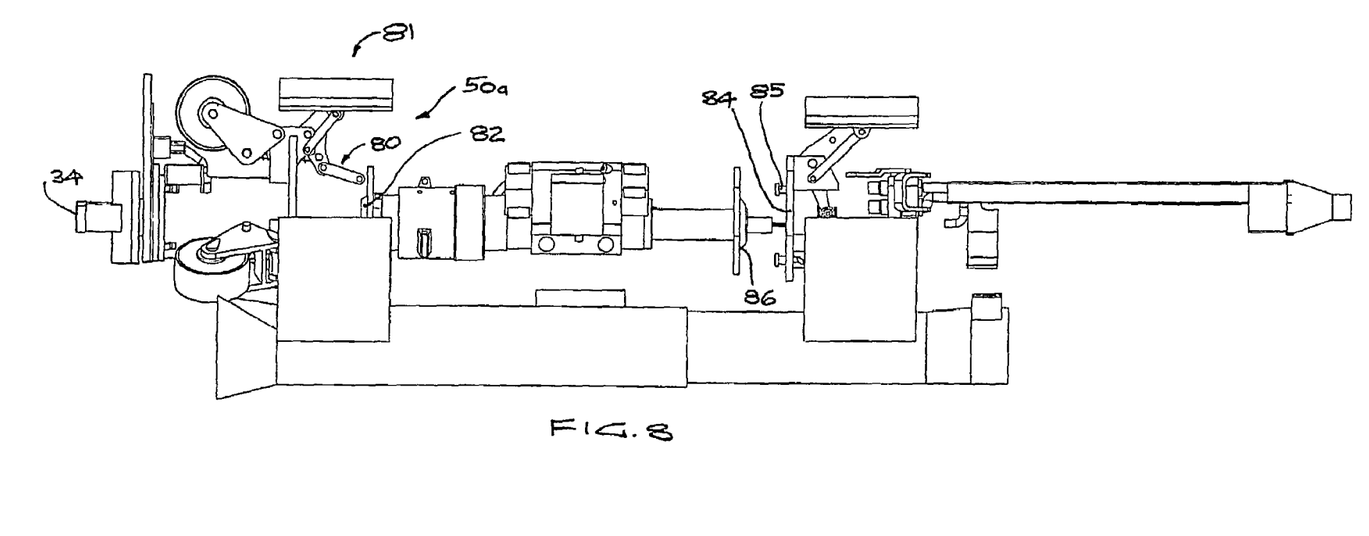
FIG. 8 is a side view of the vehicle of FIG. 4 shown exploded.

As seen in FIGS. 7 and 8, the vacuum pipe 9 comprises a forward section 9a and rearward section 9b slidingly received therein. This telescoping action allows the overall length of the machine to be reduced for ready insertion into manholes, or the like, for access to drains. The wall-engaging mechanisms 20a, 50a are modular units suitable for use in a limited range of pipe diameters and can be readily demounted from the cylinder 2 and rod 4. The front module 81 includes mechanism 50a as well as the motor 7 and attached cutter 34 which is located on a taper 82 and fixed by fasteners (not shown). The rear module 83 includes mechanism 20a connected to plate 84. Tapered portion 84 fixed to the rod 4 locates the plate 84 centrally. Pins 85 on the plate 84 have flat heads received through keyhole-shaped apertures (not shown) to mount the module 83 by a push-and-turn action.

Figure 9:
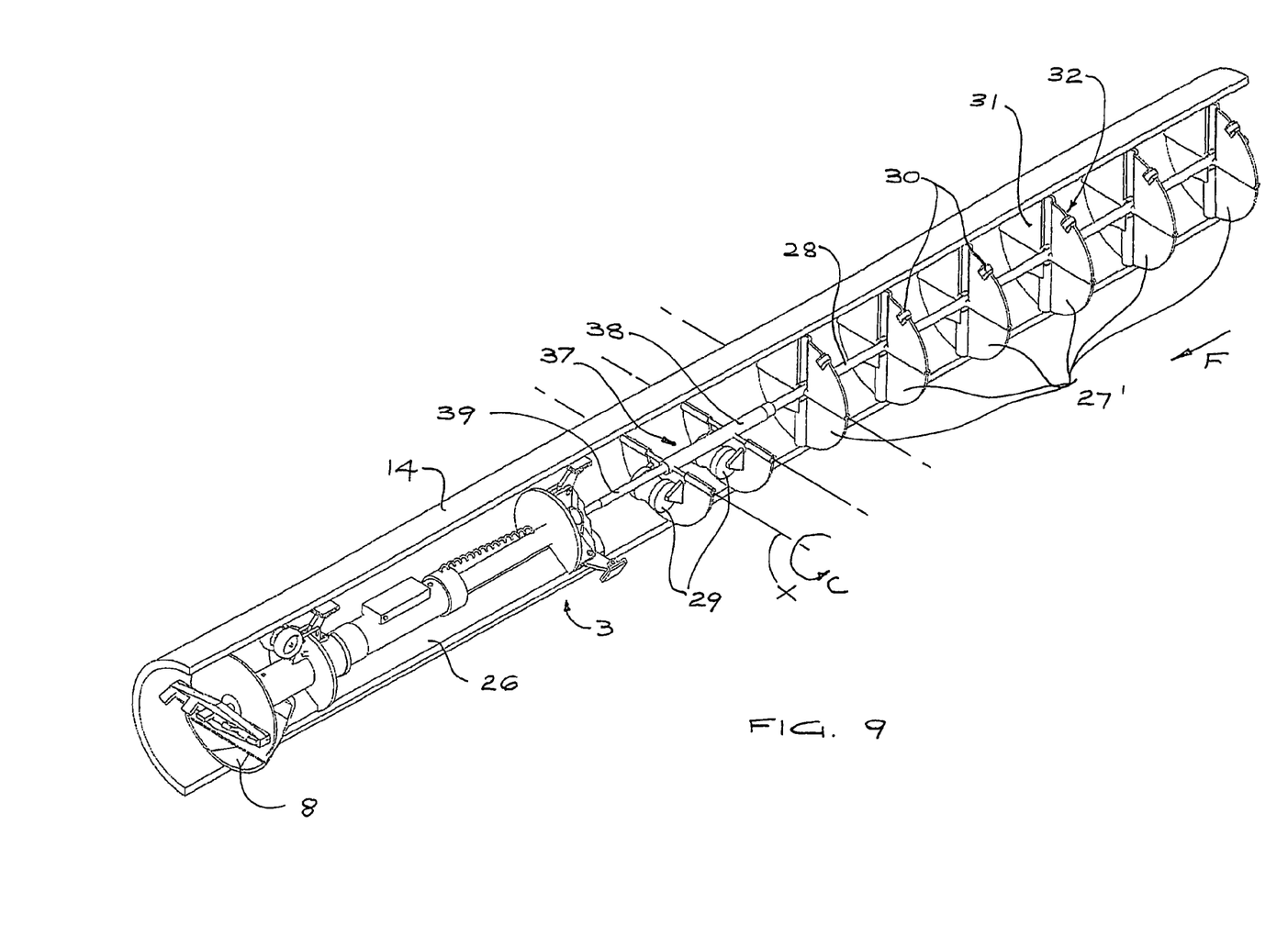
FIG. 9 is a pictorial view of a third embodiment of the conduit cleaning apparatus of the present invention.

A third embodiment of the vehicle shown in FIG. 9 is like the first embodiment but includes an alternative to the vacuum pipe 9 and evacuation tube for removing the loosened material. An auger 26 (driven, for example, by a hydraulic motor (not shown)) transports the loosened material from the opening 8 to the rear of the rearward member 3. A plurality of paddles 27, 27' are fixed on a shaft 28 connected to the rearward member 3 by a hydraulic ram 37. The ram 37 is provided for reciprocating the paddles 27, 27' and includes the rod 39 extending parallel to the shaft 28 to which the cylinder 38 is fixed. The paddles 27, 27' are fixed to the shaft 28 and spaced apart by a distance approximately equal to the stroke of the ram 37. Each paddle 27, 27' is freely pivoted about a respective horizontal axis X for movement between the upright position shown and a rotated position (not shown) where it is rotated in direction C.

The paddles 27 and 27' have semicircular and circular blades respectively that are sized for sliding engagement with the walls of the conduit 14. Stops (not shown) limit the rotation of the paddles 27, 27' past the upright position shown, in the direction opposite to direction C. On paddles 27 rollers 29 extend from the front face 31 to lift the paddles 27' over the auger 26. Guide wheels 30 are fixed near the top of each paddle 27' to engage the wall of the conduit 14. Each paddle 27, 27' has opposing front and rear faces 31 and 32 respectively.

In operation, the shaft 28 and paddles 27, 27' are reciprocated (e.g. with the forward member 1 fixed to the conduit 14) in order to extract the loosened material. As the front face 31 contacts the material to be extracted while being drawn forward in direction F, the paddles 27, 27' are pivoted in direction C allowing the bottom edge of the paddles 27, 27' to ride up over the material (further assisted on paddles 27 by the rollers 29 engaging the auger 26). When moved rearward the material contacts the rear face 32, rotating the paddle 27, 27' to the upright position and transporting the material rearward. In this way material is transferred between adjacent paddles 27, 27' during successive strokes.

Aspects of the present invention have been described by way of example only and it should be appreciated that modifications and additions may be made thereto without departing from the scope thereof as defined in the appended claims.

What I claim is:

1. A conduit travelling vehicle, comprising:
    an extensible body comprising a forward body portion and a rearward body portion,
    the forward body portion and the rearward body portion being separated by a powered telescoping connection of variable and controllable length, wherein the powered telescoping connection controllably alters a distance between said forward and rearward body portions;
    each of said forward body portion and rearward body portion including a wall-engaging mechanism;
    each wall engaging mechanism comprising a plurality of radially pivotable legs, each radially pivotable leg connected to one of said forward and rearward body portions at one end and having a wall-engaging foot at a distal end;
    for each wall engaging mechanism, all of the radially pivotable legs comprising wall engaging feet connecting to a common actuator, said common actuator controlling the radially extended position of said radially pivotable legs between retracted and extended positions;
    at least one of the wall engaging mechanism including at least one retractable wheel arrangement, said retractable wheel arrangement comprising a plurality of wall engageable wheel assemblies each coupled to a radially pivoting wheel bracket;

said radially pivotable legs and said radially pivoting wheel brackets of said one wall engaging mechanism coupled with a coupling, the coupling preventing both of i) said radially pivotable legs and ii) said radially pivoting wheel brackets from being simultaneously in a fully radially extended position.

2. The conduit travelling vehicle of claim 1, wherein the telescoping connection between said forward body portion and said rearward body portion comprises a cylinder and rod, one of said body portions being connected to the cylinder, and the other of said body portions being connected to the rod.

3. The conduit travelling vehicle of claim 2, wherein the common actuator of at least one said wall engaging mechanism comprises an annular travelling cylinder about the cylinder of the telescoping connection.

4. The conduit travelling vehicle of claim 2, wherein the common actuator of at least one said wall engaging mechanism is attached to the rod of the telescoping connection, and comprises a piston and cylinder arrangement incorporating the rod of the telescoping connection.

5. The conduit travelling vehicle of claim 1, wherein the radially pivotable legs of at least one said wall engaging mechanism are of substantially equal length and distributed, relative to the longitudinal axis of the conduit travelling vehicle, with substantially equal angles of radial separation from each other.

6. The conduit travelling vehicle of claim 1, wherein said retractable wheel arrangement comprises a non-rigid coupling arrangement accommodating radial travel of said wall engageable wheel assembly in response to irregularities in the wall of a conduit.

7. The conduit travelling vehicle of claim 1, wherein at least one said wall-engaging foot is pivotably connected to the radially pivotable leg with which the wall-engaging foot is associated.

8. The conduit travelling vehicle of claim 7, wherein,
each radially pivoting leg is pivotably attached to a corresponding wall-engaging foot by a first pivot and to an associated one of said forward and rearward body portions by a second pivot;
a control linkage is pivotally attached at one end to said wall-engaging foot by a third pivot and pivotally attached by a fourth pivot, at a distal end, to the associated one said forward and rearward body portion;
a pantographic arrangement provided by orientation of said wall-engaging foot, relative to the longitudinal axis of the conduit travelling vehicle, remains constant for any radially splayed position of the attached radially pivoting leg.

9. The conduit travelling vehicle of claim 1, wherein the radially pivotable legs of the wall engaging mechanism of the rearward body portion are angled to trail rearwardly when fully extended.

10. The conduit travelling vehicle of claim 1, wherein each wall-engaging mechanism comprises a modular assembly removably mounted to the an associated forward or rearward body portion.

11. The conduit travelling vehicle of claim 1, wherein each wall-engaging mechanism is remotely controllable with respect to extending and retracting the radially pivotable legs.

12. The conduit travelling vehicle of claim 1, further comprising a rotary cutter mounted at the front of the forward body portion.

13. The conduit travelling vehicle of claim 12, said apparatus further comprising:
a sensor for sensing a load applied to said rotary cutter when the cutter encounters foreign material in a conduit;
said sensor connected to control means influencing the rate of forward movement of the conduit travelling device by synchronized operation of the telescoping connection and wall engaging mechanisms.

14. The conduit travelling vehicle of claim 1, further comprising outwardly directed water jets on the forward body portion.

15. The conduit travelling vehicle of claim 1, further comprising a vacuum line with an inlet, mounted to one to the forward and rearward body portions such that the inlet is on the underside of the conduit travelling vehicle.

16. The conduit travelling vehicle of claim 1, further comprising a retractable wheel arrangement on the front body portion of the conduit travelling vehicle.

17. The conduit travelling vehicle of claim 1, wherein,
a plurality of longitudinally separated and connected blade elements are coupled to the rearward body portion of the conduit travelling vehicle;
said blades comprising an element of at least part circular shape, and of commensurate radius to the conduit, wherein the vehicle in use is oriented to the plane perpendicular to the longitudinal axis of the conduit travelling vehicle;
at least a portion of said blades being positioned below the level of the longitudinal axis of said conduit travelling vehicle and including a pivotable connection allowing pivoting of the lowermost portion of a blade about a pivot axis lying in said plane perpendicular to the longitudinal axis of the conduit travelling vehicle,
said pivoting is restricted to between the blade being within said plane perpendicular to the longitudinal axis of the conduit travelling vehicle, and at an angle in one direction therefrom about said pivot axis; and
the permitted direction of pivoting of all blade portions are identical.

18. The conduit travelling vehicle of claim 17, wherein said blades being are coupled to the rearward body portion by a linear actuator, the linear actuator operable to impart a linear reciprocating motion to said blades.

19. A conduit travelling vehicle as claimed in claim 1, further comprising an inspection camera.

20. A method of moving a conduit travelling vehicle, along a conduit, said method comprising the step of:
with a conduit travelling vehicle, comprising
an extensible body comprising a forward body portion and a rearward body portion,
the forward body portion and the rearward body portion being separated by a powered telescoping connection of variable and controllable length, wherein the powered telescoping connection controllably alters a distance between said forward and rearward body portions;
each of said forward body portion and rearward body portion including a wall-engaging mechanism;
each wall engaging mechanism comprising a plurality of radially pivotable legs, each radially pivotable leg connected to one of said forward and rearward body portions at one end and having a wall-engaging foot at a distal end;
for each wall engaging mechanism, all of the radially pivotable legs comprising wall engaging feet connecting to a common actuator, said common actuator controlling the radially extended position of said radially pivotable legs between retracted and extended positions;

at least one of the wall engaging mechanism including at least one retractable wheel arrangement, said retractable wheel arrangement comprising a plurality of wall engageable wheel assemblies each coupled to a radially pivoting wheel bracket;

said radially pivotable legs and said radially pivoting wheel brackets of said one wall engaging mechanism coupled with a coupling, the coupling preventing both of i) said radially pivotable legs and ii) said radially pivoting wheel brackets from being simultaneously in a fully radially extended position, alternately operating the common actuator of each wall engaging mechanism to radially extend the connected radially pivotable legs to an extended position, and successively extending and contracting the telescoping connection in synchronicity with operation of said common actuators, to alternately move the forward and rearward body portions when the respective legs of one of the forward and rearward body portions are in a retracted position, and the respective legs of the other one of the forward and rearward body portions body portions are not in the retracted position.

\* \* \* \* \*

UNITED STATES PATENT AND TRADEMARK OFFICE
CERTIFICATE OF CORRECTION

| | | |
|---|---|---|
| PATENT NO. | : 7,597,048 B2 | Page 1 of 1 |
| APPLICATION NO. | : 10/583548 | |
| DATED | : October 6, 2009 | |
| INVENTOR(S) | : Colin Brian Nicholson | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 252 days.

Signed and Sealed this

Twenty-eighth Day of September, 2010

David J. Kappos
*Director of the United States Patent and Trademark Office*